United States Patent [19]

Lob et al.

[11] Patent Number: 5,304,789
[45] Date of Patent: Apr. 19, 1994

[54] MULTILAYER CARD-SHAPED DATA CARRIER AND METHOD FOR PRODUCING SAME

[75] Inventors: Erwin Lob; Hansjürgen Merkle; Alexander Hierweger; Wolfgang Killar, all of München; Wittlich Kaule, Emmering, all of Fed. Rep. of Germany

[73] Assignee: Gesellschaft Fur Automation Und Organisation mbH(GAO), Muchen, Fed. Rep. of Germany

[21] Appl. No.: 776,155

[22] Filed: Oct. 15, 1991

[30] Foreign Application Priority Data

Oct. 19, 1990 [DE] Fed. Rep. of Germany ....... 4033300

[51] Int. Cl.⁵ .................. G06K 19/00; G06K 19/06; B42D 15/00
[52] U.S. Cl. .................. 235/487; 235/491; 235/493; 235/494; 283/85
[58] Field of Search ............... 235/491, 493, 494, 487; 283/89, 94, 100, 85

[56] References Cited

U.S. PATENT DOCUMENTS

| | | | |
|---|---|---|---|
| 4,157,784 | 6/1979 | Gröttrup et al. | 283/89 |
| 4,504,084 | 3/1985 | Jauch | 283/94 |
| 4,523,777 | 6/1985 | Holbein et al. | 283/100 |
| 4,544,181 | 10/1985 | Maurer et al. | 283/94 |
| 4,766,026 | 8/1988 | Lass et al. | 283/94 |

FOREIGN PATENT DOCUMENTS

| | | |
|---|---|---|
| 2530905 | 2/1976 | Fed. Rep. of Germany . |
| 2654208 | 5/1978 | Fed. Rep. of Germany . |
| 2548801 | 1/1985 | France . |

*Primary Examiner*—Sikes: William L.
*Assistant Examiner*—Trong Phan
*Attorney, Agent, or Firm*—Keck, Mahin & Cate

[57] ABSTRACT

A multilayer card-shaped data carrier has a layer appearing black in the visible wave range, but transparent or permeable to electromagnetic radiation in the invisible wavelength spectrum outside the wavelengths substantially between about 400 and 700 nanometers. The data carrier also has data markings camouflaged by the black layer produced within or below the black layer by a lasing device, which are likewise detectable by commercial optical readers operating in the invisible wavelength spectrum outside the wavelengths substantially between about 400 and 700 nanometers.

16 Claims, 1 Drawing Sheet

MULTILAYER CARD-SHAPED DATA CARRIER AND METHOD FOR PRODUCING SAME

BACKGROUND OF THE INVENTION

This invention is entitled to priority benefits under Title 35, United States Code, Section 119 through German Patent Application No. P 40 33 300.0, filed Oct. 19, 1990, for "A multilayer card-shaped data carrier and a method for producing it."

FIELD OF THE INVENTION

The present invention relates to a multilayered card-shaped data carrier having a hidden data marking, and more particularly, to a multilayer card-shaped data carrier having a layer opaque to visible light yet transparent or permeable to electromagnetic radiation in wavelength spectrums invisible to the human eye and substantially defined by electromagnetic radiation outside the wavelengths between 400 and 700 nanometers, the layer bearing the data marking detectable only through appropriate scanning light wavelengths and camouflaged by the opaque layer in such a way that it is not recognizable visually.

DESCRIPTION OF THE PRIOR ART

Known data carriers of the aforesaid type have the advantage that a viewer cannot, without aid, see the authenticity data marking concealed under an opaque (or black) layer. This makes forgery difficult. On the other hand, the data markings can be readily dectected or scanned automatically, for example, by means of infrared radiation commonly used in scanning devices.

However, known data carriers have the disadvantage that the data markings must be produced during initial production of the card, since the black layer and any further cover layers must be laminated thereon during final production steps. Particularly in the case of identity cards and credit cards, it is generally necessary to incorporate personal data, such as data identifying the authorized card user, in a final processing step frequently at the place of issue. Such subsequent incorporation of the data marking in the otherwise finished card thus is not possible with these known data carriers.

Data carriers are also known wherein certain information is printed onto an apparently black cover layer in a final operation, the data markings constituting the information to be hidden being about equally absorbent in the visible light wave spectrum as the black cover layer, so that the information cannot be detected with the naked eye. The background color is made transparent or permeable to the infrared light wave spectrum and the ink with which the information was printed is opaque or absorbent in the infrared light wave spectrum. Thus, when viewed by a detector or scanner operating in the infrared spectrum, the data markings and information contained therein can be detected or scanned perfectly. The background appears to be very diffusely reflecting (i.e., white), while the information printed thereon appears to be highly absorbent (i.e., black).

Although personal information can be printed on such a card as a final production operation, these known data carriers have the disadvantage that the information is necessarily located on the outer surface and is thus readily accessible to manipulation and attempted forgery.

Further, a data carrier is also known wherein a machine-readable binary code is covered with a protective layer opaque to the visible light wave spectrum, so that the binary code is invisible to the naked eye but detectable or scannable by a scanner. The scanner preferably works with a scanning wavelength for which the protective layer is transparent or permeable, but the binary code is absorbent. This data carrier also has the shortcoming stated above, namely, that the binary code must be incorporated during the production process of the data carrier. Subsequent "personalization" is therefore not possible at the place of issue.

The present invention is accordingly based on the identification and solution of the problem presented by a desired data carrier having a data marking incorporated in a final production step which is invisible to the naked eye and which also cannot be easily manipulated or forged.

This problem is solved according to the present invention by a multilayer card-shaped data carrier having an inner layer appearing opaque or black in the visible light wavelength spectrum of electromagnetic radiation yet transparent or permeable to an electromagnetic radiation in a wavelength spectrum invisible to the human eye, substantially defined by electromagnetic radiation outside the wavelengths between 400 and 700 nanometers. The layer bears a data marking detectable only through appropriate scanning devices and is camouflaged by the apparently black layer in such a way that it is not recognizable visually.

The improved data carrier of the present invention thus provides a new approach in providing tamper resistant data deposited as a final production step.

SUMMARY OF THE INVENTION

In accordance with the present invention, a laser pencil is used to deposit or encode information onto a properly sensitized inner layer structure of a card-shaped data carrier, even if the layer structure is visually opaque, so long as the layers to be penetrated are sufficiently transparent or permeable to the wavelength of the laser. Information can thus be deposited or encoded within only the sufficiently sensitized black layers. It is possible to deposit or encode this information in a virtually finished datacard as a final method step, remotely and independently from the card manufacturer. Since the information is deposited or encoded inside the layers which form the card structure, as opposed to the outer surface of the data carrier, it is inaccessible and thus highly resistant to forgery. Further, upon visual inspection, no information can be seen since the opaque black camouflage layer prevents direct visual access to the laser data.

Since the black layer is transparent or permeable to only the wavelength of light from the scanning device, preferably infrared (IR) light, the data marking can be readily detected or scanned by a suitable scanner since the data marking itself is opaque or impermeable to the wavelength of the scanning radiation.

Further, if an external design is necessary, printed inks on the data carrier outer surface are sometimes used which are opaque or impermeable to the lasing radiation and/or the scanning radiation. In such cases, a transparent or permeable window for the lasing and/or scanning radiation is preferably left open within the printed layer. This window appears black to the viewer, yet allows the data markings to be deposited or encoded into the data carrier and subsequently detected or scanned.

An effect that is particularly appealing aesthetically is obtained if the black layer is covered with films and/or prints containing pearlescent pigments, such as Iriodin®. Pearlescent inks contain pigments from mica sheets that are coated with a metallic oxide. Inks produced from these pigments or films containing these pigments appear particularly well on a black background. As they are transparent or permeable to light in the infrared spectrum, these films or inks do not impede either the deposition or encoding of the data markings or subsequent detecting or scanning of the data markings.

As an additional embodiment of the invention, the black window offering access to the data layer can be applied to the data card selectively in the form of readable patterns, characters or a logo. The outer contours of the black layer can thus also constitute certain information.

The size of these patterns or characters can be selected so as to be directly detectable by the reading head of a commercial optical character reader (OCR). However, one can further utilize the additional properties of commercial OCRs since such OCRs are generally capable of detecting a substantially higher information density than larger OCR print. For example, one can conceal under the black layer a binary code with an information density adapted to the maximum resolution of OCR. The OCR print can of course also be combined with the black characters, patterns or the logo, whereby the particular pieces of information may have a certain mutual relationship.

To deposit or encode the data marking, a laser pencil working in the IR spectrum may be preferably employed. The writing is preferably performed in raster printing, i.e., the individual laser dots do not overlap. The intensity of the laser pencil must be adjusted to prevent warps or thermal distortions which may arise in the surface and which may be visible upon oblique viewing of the data card's outer surface.

Warps or thermal distortions of the surface can be avoided according to an additional aspect of the invention by using a special layer structure for the card. The black layer may be located on an opaque white layer, forming a so-called inlay film of the card. The black layer is highly sensitized when exposed to laser radiation through a suitable additive, i.e., carbon black. Above the black layer there is a further layer forming the cover layer of the card. This cover layer is transparent and weakly sensitized to the laser radiation actually used.

Through this structure, the discoloration of the film material begins first in the presence of the laser beam at the boundary layer between the highly sensitized black layer and the white inlay film reflecting the laser radiation and further propagates within the volume of the black layer as far as the opposite surface thereof. It has been shown that the discoloration continues into the weakly sensitized cover layer to a very small degree or even not at all. This structure obtains high-contrast data markings that are detectable with corresponding reliability by OCRs with no warps or deformations that might be recognizable at an oblique angle.

To color the black layer, any desired ink can be used, so long as the color concentration is within a range rendering the ink substantially transparent to infrared radiation. It is important in the context of the invention that the layer be at least as dark as the laser writing or data marking produced below the layer or within the layer. Suitable colorants are, for example, Microlites® from the Ciba Geigy Company.

Thus, a multilayer card-shaped data carrier having a cover layer and layers disposed below is disclosed, where one of the layers disposed below appears black in the visible wavelength spectrum and is transparent in the invisible wavelength spectrum outside the wavelengths substantially between about 400 and 700 nanometers. Further, one of the layers disposed below is also absorbent to focused radiation in the invisible wavelength spectrum to allow the deposition or encoding and subsequent detection of a data marking camouflaged by the black layer, the data marking thus being rendered invisible in the visible wavelength spectrum.

BRIEF DESCRIPTION OF THE DRAWINGS

For a more complete understanding of this invention, one should refer to the embodiment illustrated in greater detail in the accompanying drawings and described below by way of examples of the invention.

In the drawings.

Figure 1:
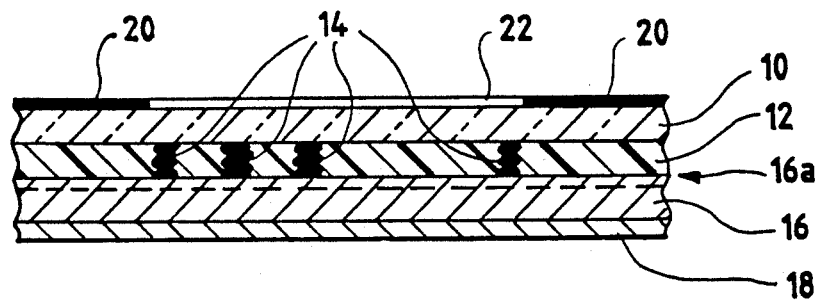
FIG. 1 shows a cross-sectional view through a card-shaped data carrier.

It should be understood that the drawings are not necessarily to exact scale and that certain aspects of the embodiments are illustrated by graphic symbols, schematic representations and fragmentary views. It should also be understood that when referring to physical relationships of components by terms such as "upper", "lower", "upward", "downward", "vertical", "horizontal", "left", "right" or the like, such terms have reference solely to the orientation depicted in the drawings. Actual embodiments or installations thereof may differ.

While much mechanical detail, including other plan and section views of the particular embodiment depicted have been omitted, such detail is not per se part of the present invention and is considered well within the comprehension of those skilled in the art in light of the present disclosure. The resulting simplified presentation is believed to be more readable and informative and readily understandable by those skilled in the art. It should also be understood, of course, that the invention is not limited to the particular embodiment illustrated.

DETAILED DESCRIPTION OF THE PREFERRED EMBODIMENT

Referring to the figures, wherein like reference characters designate like or corresponding parts throughout the views, FIG. 1 illustrates a card structure having an uppermost cover film 10 that is transparent or permeable to light in the visible wavelength spectrum, i.e., between 400 and 700 nanometers. The layer is also transparent or permeable to a laser pencil working in the IR spectrum. Below cover film 10, there is a layer 12 which is dyed black with an infrared-spectrum transparent or permeable ink. A suitable colorant is Microlite® or a mixture of Microlites® from the Ciba Geigy Company.

The layer 12 is also sensitized to the energy of an IR laser, i.e., by the addition of carbon black. The laser radiation is thus absorbed by the layer 12 material, causing thermal decomposition and consequent blackening within the focus of the laser beam. The data markings 14 deposited or encoded by the laser beam can be seen as darkened regions in layer 12 in FIG. 1. The data markings 14 in layer 12 are not discernable by the naked eye since layer 12 is dyed to a blackness matching that of data markings 14, eliminating a visible contrast.

Layer 10, covering black layer 12, can likewise be weakly sensitized by a suitable addition of carbon black to form characters, if desired.

Below the black layer 12 there may be an inlay film 16, containing titanium dioxide as a filler, for example, and therefore appearing white. The card structure can be covered on the back by a cover layer 18 or further layers. In the context of the present invention, the further sequence of layers is unimportant.

It has been observed that the described structure of layers 10, 12, 16 results in high-contrast data markings that are readily detectable or scannable by an OCR without any visible irregularities being formed on the surface of the card structure.

A printed layer 20 can be also placed on cover layer 10, or optionally directly on black layer 12, consisting of an ink transparent or permeable to the lasing wavelength and the scanning wavelength. Such inks are known and can always be used when the card is not to be thoroughly black for reasons of design. If other inks are used that absorb IR light, a window 22 can be left open in the cover layer through which the data markings can be deposited or encoded in black layer 12 and also detected or scanned from layer 12.

Although not shown in the figures, data markings 14 can be formed, not in black layer 12, but in a sensitized intermediate layer 16a located therebelow. In such case, black layer 12 must not absorb the laser energy, allowing data markings 14 to only occur in layer 16a located therebelow, which of course must be designed as to absorb the laser energy to a sufficient degree.

Pearlescent pigments, i.e., Iriodin ®, can be embedded in cover layer 10 to produce a particularly pleasing aesthetic effect, yet maintain transparency or permeability to IR radiation. This impairs neither the deposition or encoding or the subsequent detection of the data markings.

Figure 2:
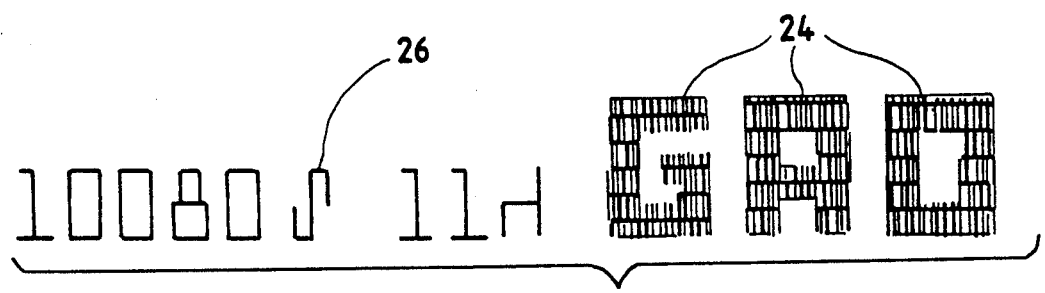
FIG. 2 shows a data marking in binary code together with OCR print.
Figure 3:
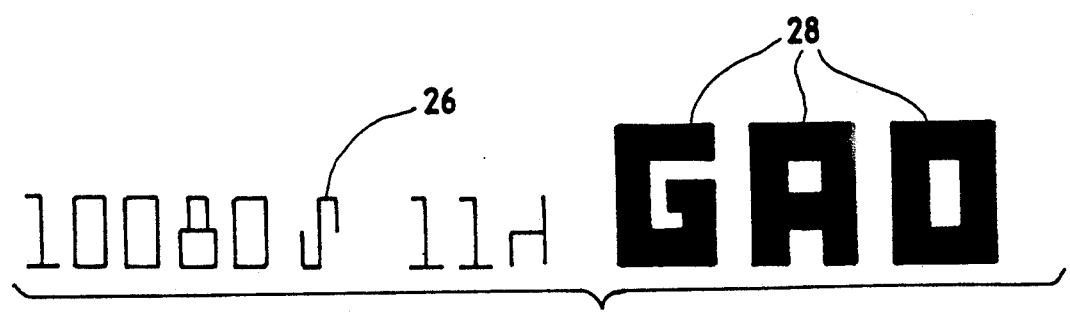
FIG. 3 shows the binary code of FIG. 2 covered with an opaque, apparently black layer.

Black layer 12 need not entirely cover the data carrier. It can also be applied to an information carrier in the form of patterns, characters or a logo 24 as shown in FIG. 2. Within the contour of the black letters "GAO", there is a miniature binary code with a high information density that can still be resolved by a commercial OCR. As readily indicated by FIG. 2, the information density of OCR print 26 is substantially smaller than that of binary code 24. As indicated by FIG. 3, the binary code is located below a cover layer 28 which is not transparent or permeable to light in the wavelength spectrum of about 400 to 700 nanometers and therefore appears black. However, the layer 28 is transparent or permeable to IR radiation, allowing binary code 24 to be encoded or burned into the information carrier located under black layer 28. In the same way, it is readily possible to detect or scan the binary code through black layer 28 with scanning radiations falling within the IR spectrum.

It should be noted that the information of the OCR print 26 can be redundantly stored in binary code 24 to increase the protection from falsification.

Additionally, applying black layer 28 in the form of letters, patterns or characters which themselves constitute useful information as well as visually cover deposited information located therebelow, as shown in FIG. 3, offers a wide range of possible designs for data carriers or cards meeting a high security standard.

It will be understood that the details, materials and arrangements of parts of specific embodiments have been described and illustrated to explain the nature of the invention. Changes may be made by those skilled in the art without departing form the invention as expressed in the appended claims.

We claim:

1. A multilayer card-shaped data carrier comprising:
   a cover layer;
   layers disposed below said cover layer, one of said layers disposed below said cover layer appearing black in the visible wavelength spectrum and being transparent or permeable to electromagnetic radiation in the invisible wavelength spectrum outside the wavelengths substantially between about 400 and 700 nanometers;
   one of said layers disposed below said cover layer being absorbent to focused electromagnetic radiation in said invisible wavelength spectrum; and
   a data marking produced by said focused electromagnetic radiation in said invisible wavelength spectrum disposed in said absorbent layer, said black layer camouflaging said data marking so as to render said data marking invisible in the visible wavelength spectrum substantially between about 400 and 700 nanometers.

2. The invention of claim 1, wherein said black layer is highly sensitized to said focused electromagnetic radiation in the invisible wavelength spectrum in that said black layer absorbs said focused electromagnetic radiation in the invisible wavelength spectrum to produce said data marking within said black layer.

3. The invention of claim 2, further comprising a contrasting opaque layer disposed beneath said black layer,
   said cover layer disposed over said black layer being weakly sensitized to said focused electromagnetic radiation in the invisible wavelength spectrum to produce said data marking.

4. The invention of claim 1, wherein said absorbent layer is disposed beneath said black layer, said absorbent layer being substantially absorbent to focused electromagnetic radiation in said invisible wavelength spectrum.

5. The invention of claim 1, wherein said cover layer and said layers disposed below said cover layer and disposed above said black layer are transparent, opaque or colored in the visible wavelength spectrum substantially between about 400 and 700 nanometers, said transparent, opaque or colored layers being transparent or permeable to said electromagnetic radiation in said invisible wavelength spectrum or provided with a window area under which said data markings are disposed.

6. The invention of claim 1, further comprising prints or films containing pearlescent pigments disposed above the said black layer.

7. A multilayer card-shaped data carrier comprising:
   a cover layer;
   layers disposed below said cover layer, one of said layers disposed below said cover layer appearing black in the visible wavelength spectrum and being transparent or permeable to electromagnetic radiation in the invisible wavelength spectrum outside the wavelengths substantially between about 400 and 700 nanometers, said black layer being applied to said multilayer card-shaped data carrier to form visually recognizable or readable patterns or characters;

one of said layers disposed below said cover layer being absorbent to focused electromagnetic radiation in said invisible wavelength spectrum; and a data marking produced by said focused electromagnetic radiation in said invisible wavelength spectrum disposed in said absorbent layer, said black layer camouflaging said data marking so as to render said data marking invisible in the visible wavelength spectrum substantially between about 400 and 700 nanometers.

8. The invention of claim 7, wherein said patterns or characters are detectable by a commercial optical character reader.

9. The invention of claim 8, wherein said data markings covered by said black layer are binary codes having a high information density compared with the optical character reader print.

10. The invention of claim 7, wherein said black layer applied to said multilayer card-shaped data carrier to form visually recognizable or readable patterns or characters and said data markings are visually combined.

11. The invention of claim 10, wherein said patterns or characters detectable by a commercial optical character reader bear certain information and said data marking bears certain information, said information of said characters being related to said information of said data marking.

12. A method for producing a multilayer card-shaped data carrier comprising the steps of:

forming a cover layer;

disposing layers below said cover layer, one of said layers disposed below said cover layer appearing black in the visible wavelength spectrum and being transparent or permeable to electromagnetic radiation in the invisible wavelength spectrum outside the wavelengths substantially between about 400 and 700 nanometers;

causing one of said layers disposed below said cover layer to be absorbent to focused electromagnetic radiation in said invisible wavelength spectrum; and producing a data marking through said focused electromagnetic radiation in said invisible wavelength spectrum on said absorbent layer as a substantially last production step, said black layer camouflaging said data marking so as to render said data marking invisible in the visible wavelength spectrum substantially between about 400 and 700 nanometers.

13. The method of claim 12, wherein said data markings are formed directly in the black layer through said focused electromagnetic radiation in said invisible wavelength spectrum.

14. The method of claim 12, wherein said focused electromagnetic radiation in said invisible wavelength spectrum passes through said black layer without any substantial loss of energy, said data markings being formed below said black layer in a layer highly absorbent to electromagnetic radiation in said invisible wavelength spectrum.

15. The method of claim 12, wherein the intensity of said focused electromagnetic radiation in said invisible wavelength spectrum is adjustable, said focused electromagnetic radiation in said invisible wavelength spectrum creating no or substantially no visually discernable warps or thermal distortions on the surface of said multilayer card-shaped data carrier.

16. The method of claim 12, wherein said focused electromagnetic radiation in said invisible wavelength spectrum operates in the infrared wavelength spectrum.

* * * * *